US008902868B2

(12) United States Patent
Raveendran

(10) Patent No.: US 8,902,868 B2
(45) Date of Patent: Dec. 2, 2014

(54) METHOD AND APPARATUS FOR WIRELESSLY DISTRIBUTING MULTIPLEX SIGNAL COMPRISING MULTIMEDIA DATA OVER A LOCAL AREA NETWORK

(75) Inventor: Vijayalakshmi R. Raveendran, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 979 days.

(21) Appl. No.: 12/422,178

(22) Filed: Apr. 10, 2009

(65) Prior Publication Data

US 2010/0040031 A1 Feb. 18, 2010

Related U.S. Application Data

(60) Provisional application No. 61/089,407, filed on Aug. 15, 2008.

(51) Int. Cl.
*H04W 4/00* (2009.01)
*H04N 21/436* (2011.01)
(Continued)

(52) U.S. Cl.
CPC ..... *H04N 21/4788* (2013.01); *H04N 21/43615* (2013.01); *H04W 92/02* (2013.01);
(Continued)

(58) Field of Classification Search
USPC .......................................................... 370/338
See application file for complete search history.

(56) References Cited

U.S. PATENT DOCUMENTS 5,708,961 A * 1/1998 Hylton et al. .................... 725/81
6,590,928 B1 * 7/2003 Haartsen ........................ 375/134

(Continued)

FOREIGN PATENT DOCUMENTS

CN 1217844 A 5/1999
EP 1195931 A2 4/2002
(Continued)

OTHER PUBLICATIONS

Gubbi, R: "Isochronous services in home multimedia networks" Communications, Computers and Signal Processing, 1999 IEEE Pacific Rim Conference on Victoria, BC, Canada Aug. 22-24, 1999, Piscataway, NJ, USA,IEEE, US, Aug. 22, 1999, pp. 534-539, XP010356692 ISBN: 978-0-7803-5582-8 paragraph [0001]-paragraph [03.2].

(Continued)

*Primary Examiner* — Guang Li
(74) *Attorney, Agent, or Firm* — Brent A. Boyd

(57) ABSTRACT

Described herein are various techniques for gathering multimedia data from one or more sources and transmiting that data over a local network to one or more devices, thereby providing ubiquitous multimedia across the network. In one configuration, a device comprising a server receives multimedia data from one or more devices on a local network, creates a multiplex signal from the various multimedia data received from the devices, and wirelessly transmits the multiplex signal over the local network. The server is further configured wherein the multiplex signal comprises a plurality of logical channels, with at least one of the logical channels representing multimedia data received from one of the devices on the network. By then tuning into one or more of the logical channels of the transmitted multiplex signal, a device on the local network can present to a user multimedia data that originates from or resides on another device on the network. According to other configurations, the multiplex signal contains not only multimedia data retrieved from devices on a local network, but can also include multimedia data that originated from sources on a wide area network, such as the Internet or a cellular telephone network.

28 Claims, 15 Drawing Sheets

(51) Int. Cl.
*H04N 21/4363* (2011.01)
*H04L 29/06* (2006.01)
*H04N 21/4788* (2011.01)
*H04N 21/41* (2011.01)
*H04N 21/434* (2011.01)
*H04N 21/426* (2011.01)
*H04W 92/02* (2009.01)
*H04L 12/28* (2006.01)
*H04W 84/12* (2009.01)

(52) U.S. Cl.
CPC ........ H04L 2012/2841 (2013.01); *H04W 4/00* (2013.01); *H04N 21/43637* (2013.01); *H04L 65/605* (2013.01); *H04L 12/2838* (2013.01); *H04L 65/4076* (2013.01); *H04N 21/4104* (2013.01); *H04N 21/4344* (2013.01); *H04L 2012/2849* (2013.01); *H04N 21/42676* (2013.01); *H04N 21/4126* (2013.01); *H04N 21/42607* (2013.01); *H04W 84/12* (2013.01)
USPC ........................................................ 370/338

(56) References Cited

U.S. PATENT DOCUMENTS

| | | | |
|---|---|---|---|
| 6,857,132 B1* | 2/2005 | Rakib et al. | 725/114 |
| 6,865,609 B1 | 3/2005 | Gubbi et al. | |
| 7,020,081 B1* | 3/2006 | Tani et al. | 370/230 |
| 7,496,665 B2* | 2/2009 | Karaoguz et al. | 709/226 |
| 7,518,503 B2 | 4/2009 | Peele | |
| 7,937,484 B2* | 5/2011 | Julia et al. | 709/231 |
| 8,284,739 B2* | 10/2012 | Doyle et al. | 370/338 |
| 8,358,665 B2* | 1/2013 | Raveendran | 370/464 |
| 8,644,180 B2* | 2/2014 | Prasad et al. | 370/252 |
| 2002/0101442 A1 | 8/2002 | Costanzo et al. | |
| 2003/0156218 A1* | 8/2003 | Laksono | 348/388.1 |
| 2003/0182429 A1 | 9/2003 | Jagels | |
| 2004/0117846 A1* | 6/2004 | Karaoguz et al. | 725/134 |
| 2004/0160930 A1* | 8/2004 | Choi et al. | 370/338 |
| 2004/0175097 A1 | 9/2004 | Caspi et al. | |
| 2005/0015812 A1* | 1/2005 | Banet et al. | 725/126 |
| 2005/0259595 A1 | 11/2005 | Preguica | |
| 2005/0281236 A1 | 12/2005 | Takabatake et al. | |
| 2006/0080707 A1* | 4/2006 | Laksono | 725/38 |
| 2007/0160020 A1 | 7/2007 | Osann | |
| 2008/0084922 A1* | 4/2008 | Kleveland et al. | 375/211 |
| 2008/0172455 A1 | 7/2008 | Masucci et al. | |
| 2009/0197524 A1 | 8/2009 | Haff et al. | |
| 2010/0040082 A1 | 2/2010 | Raveendran | |
| 2010/0146078 A1 | 6/2010 | Wolff et al. | |

FOREIGN PATENT DOCUMENTS

| | | |
|---|---|---|
| EP | 1427150 A2 | 6/2004 |
| EP | 1793570 A1 | 6/2007 |
| EP | 1850548 A1 | 10/2007 |
| JP | 9224081 A | 8/1997 |
| JP | 2001239897 A | 9/2001 |
| JP | 2003143180 A | 5/2003 |
| JP | 2003318848 A | 11/2003 |
| JP | 2004303038 A | 10/2004 |
| JP | 2005509210 A | 4/2005 |
| JP | 2006129219 A | 5/2006 |
| JP | 2007259087 A | 10/2007 |
| RU | 2201034 C2 | 3/2003 |
| RU | 2265961 C2 | 12/2005 |
| TW | 200605649 | 2/2006 |
| TW | 200818770 A | 4/2008 |
| WO | 9914897 A2 | 3/1999 |
| WO | 0205492 A1 | 1/2002 |
| WO | 0250787 A1 | 6/2002 |
| WO | 03005719 A2 | 1/2003 |
| WO | WO2005013136 A1 | 2/2005 |
| WO | WO2006057606 A1 | 6/2006 |
| WO | WO2006099319 A1 | 9/2006 |
| WO | WO2007050138 | 5/2007 |
| WO | WO2007061184 A1 | 5/2007 |
| WO | WO2007067974 | 6/2007 |
| WO | 2008024037 A1 | 2/2008 |

OTHER PUBLICATIONS

International Search Report and Written Opinion—PCT/US2009/053617, International Search Authority—European Patent Office—Nov. 20, 2009.

Johnsen, L, "Content Distribution in Ad Hoc Networks", Norwegian University of Science and Technology Faculty of Information Technology, Mathematics and Electrical Engineering, Jun. 2006.

Taiwan Search Report—TW098127481—TIPO—Nov. 20, 2013.

* cited by examiner

METHOD AND APPARATUS FOR WIRELESSLY DISTRIBUTING MULTIPLEX SIGNAL COMPRISING MULTIMEDIA DATA OVER A LOCAL AREA NETWORK

This application claims the benefit of U.S. Provisional Application 61/089,407 filed on Aug. 15, 2008, the entire content of which is incorporated herein by reference.

BACKGROUND

1. Field

The present disclosure relates generally to the field of digital communication systems and, more specifically, to techniques for enabling a broadcast server to provide access between wireless communication devices for ubiquitous multimedia.

2. Background

Several radio technologies such as UWB, WiFi enable wireless personal area networks over which wireless communication devices communicate and interoperate. Typically, broadcast networks provide access to wireless communication devices using a variety of multimedia signaling formats.

There is therefore a need for techniques for enabling communication between wireless communication devices operating over diverse networks for ubiquitous multimedia.

SUMMARY

The present invention describes various techniques for gathering multimedia data from a variety of devices residing on one or more networks, and compiling the data into a multiplex signal that can be wirelessly transmitted to a variety of devices on a local network, thereby allowing the devices on the local network to access and consume multimedia data that either originates from other sources or resides on other devices on the network.

According to one aspect of the invention, a method of wirelessly distributing multimedia data to one or more devices on a local area network is disclosed. According to this method, multimedia data is received from one or more sources residing on a network, a multiplex signal that includes the multimedia data from the one or more sources is created, and the multiplex signal is transmitted to the one or more devices on the local area network.

According to another aspect of the invention, a server for wirelessly distributing multimedia data to one or more devices on a local area network is disclosed. According to this aspect, the server comprises a modem configured to receive multimedia data from at least one of the devices, and a multiplexer for creating a multiplex signal that includes the received multimedia data. The server then transmits the multiplex signal to the one or more devices located on the local area network.

According to a third aspect of the invention, an apparatus for wirelessly distributing multimedia data to one or more devices residing on a local area network is disclosed. According to this aspect, the apparatus comprises means for receiving multimedia data from one or more sources residing on a network, means for creating a multiplex signal that includes the multimedia data from the one or more sources, and means for multicasting the multiplex signal to select devices residing on the local area network.

Various other aspects and embodiments of the disclosure are described in further detail below.

The summary is neither intended nor should it be construed as being representative of the full extent and scope of the present disclosure, which these and additional aspects will become more readily apparent from the detailed description, particularly when taken together with the appended drawings.

Figure 1A:
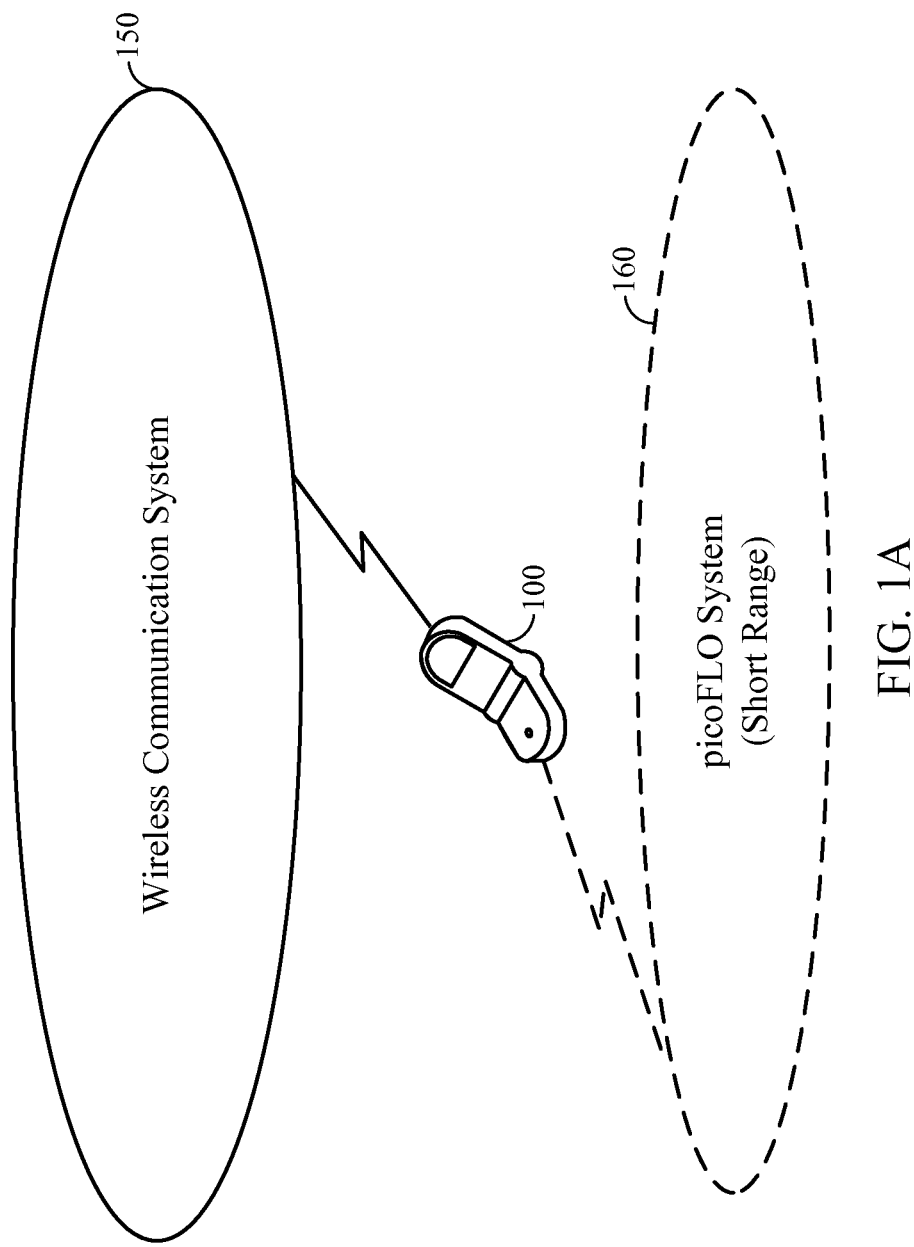
FIG. 1A shows a high-level block diagram of a wireless communication device communicating in a first system using wireless/cellular communications standards and, alternately, a picoFLO system.
Figure 1B:
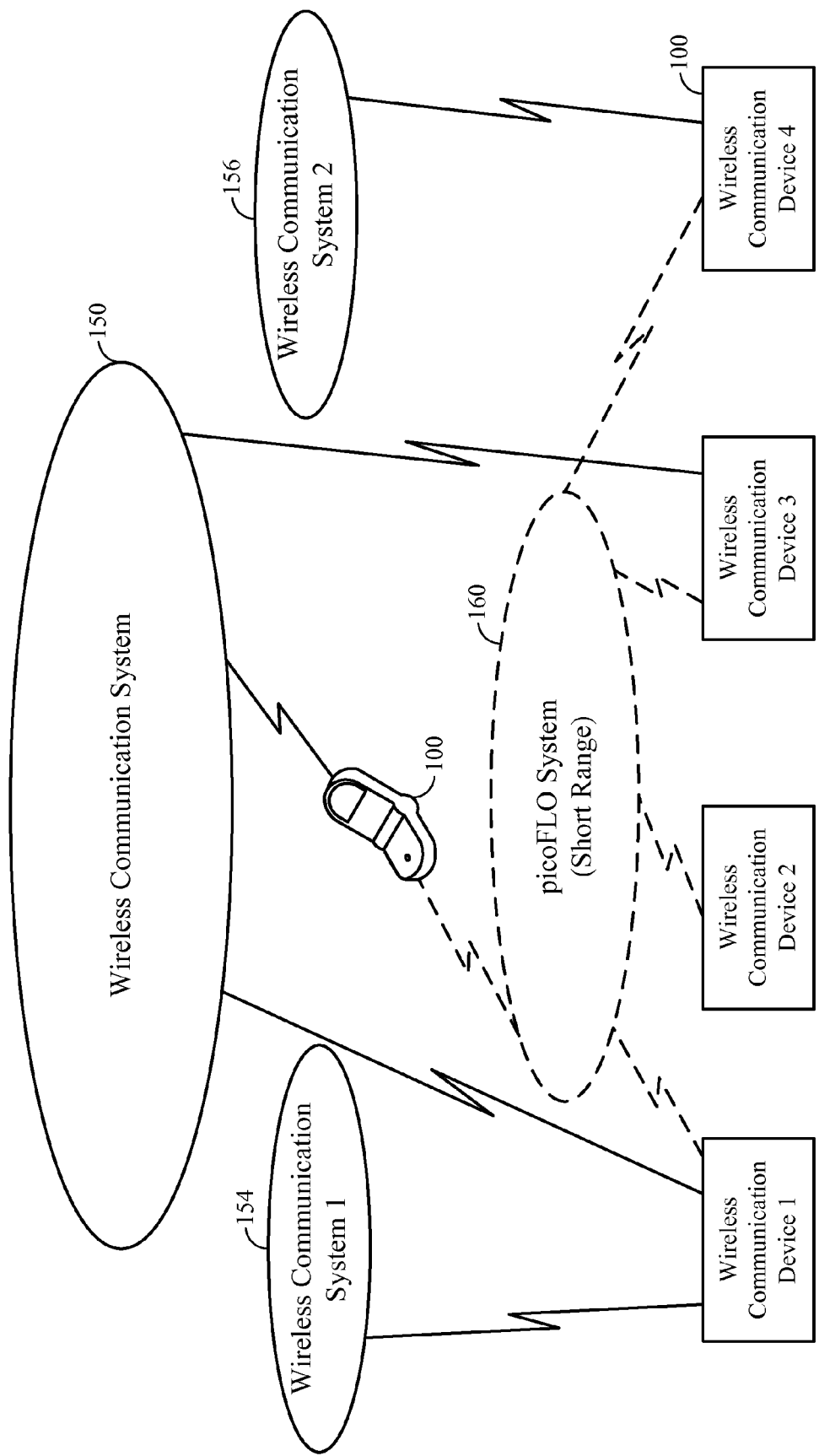
FIG. 1B shows a high-level block diagram of a picoFLO system and wireless communication systems serving wireless communication devices.

To facilitate understanding, identical reference numerals have been used, where possible, to designate identical elements that are common to the figures, except that suffixes may be added, when appropriate, to differentiate such elements. The images in the drawings are simplified for illustrative purposes and are not necessarily depicted to scale.

The appended drawings illustrate exemplary configurations of the disclosure and, as such, should not be considered as limiting the scope of the disclosure that may admit to other equally effective configurations. Correspondingly, it has been contemplated that features of some configurations may be beneficially incorporated in other configurations without further recitation.

DETAILED DESCRIPTION

Abbreviations

The following abbreviations apply to the description provided below:

PDA: Personal Digital Assistant
PC: Personal Computer
FLO: Forward Link Only
picoFLO: Pico or local broadcast system based on FLO
MLC: Media Logical Channel
CDMA: Code Division Multiple Access
GSMC: Global System for Mobile Communications WiMax: Worldwide Interoperability for Microwave Access
WiFi: Wireless Fidelity
UWB: Ultra Wideband
UMB: Ultra Mobile Broadband
UBM: Universal Broadcast Modem
LTE: Long Term Evolution
LAN: Local Area Network
WLAN: Wireless Local Area Network
IR: Infrared
USB: Universal Serial Bus
TM3: Terrestrial Mobile Multimedia Multicast
COTS: Commercial Off-The-Shelf
DVB-H: Digital Video Broadcasting-Handhelds
ISDB-T: Integrated Services Digital Broadcast-Terrestrial
OFDMA: Orthogonal Frequency Division Multiple Access
TDD: Time Division Duplex
FDD: Frequency Division Duplex
CDD: Code Division Duplex
DRM: Digital Rights Management
UMM: Universal Multimedia Modem
PN: Pseudo Noise
STB: Set Top Box
DVR: Digital Video Recording
MAC: Media Access Control
picoLC: picoFLO Logical Channel The word "exemplary" is used herein to mean "serving as an example, instance, or illustration." Any configuration or design described herein as "exemplary" is not necessarily to be construed as preferred or advantageous over other configurations or designs. Hereafter, the terms "core", "engine", "machine", "processor" and "processing unit", as well as the terms "frame" and "picture" are used interchangeably.

The techniques described herein may be used in various devices and systems for wireless and wired communications or computing, in personal electronics apparatuses, handsets, and the like. An exemplary use of these techniques for wireless communications is described below.

Figure 1C:
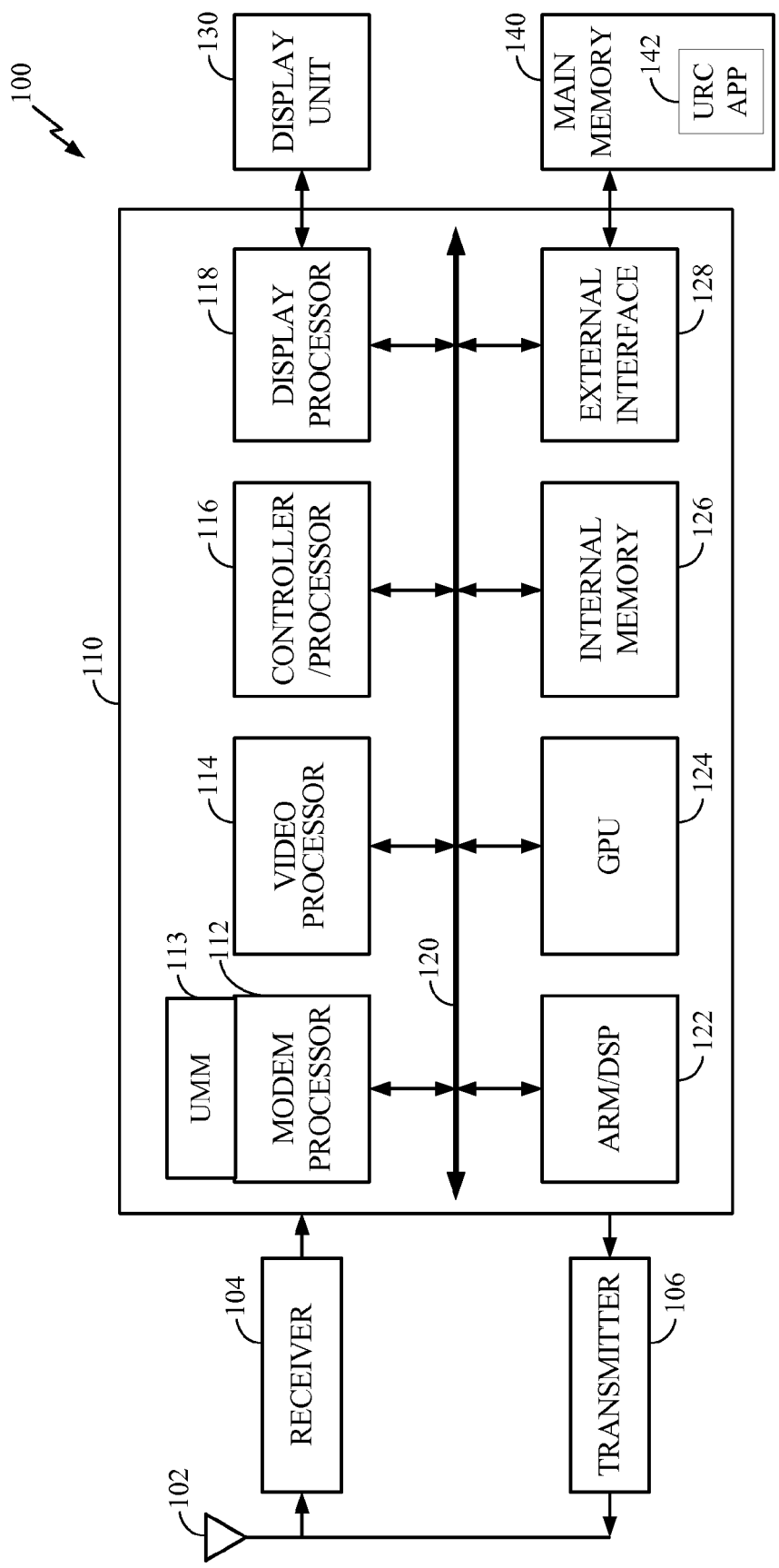
FIG. 1C shows a high-level block diagram of a wireless communication device.
Figure 1D:
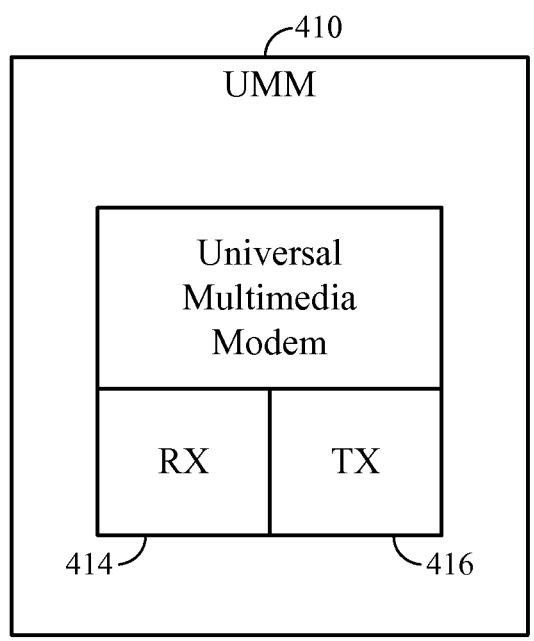
FIG. 1D shows a block diagram of a Universal Multimedia Modem.

FIG. 1C shows a block diagram of a configuration of a wireless communication device 100, which incorporates elements of the present disclosure and may be used in a wireless communication system 150 (FIG. 1A). FIG. 1C will be described in combination with FIG. 1A, where FIG. 1A shows a high-level block diagram of the wireless device 100 communicating in a first wireless communication system 150 using wireless/cellular communications standards and, alternately, a picoFLO system 160. The wireless device 100 may, for example, be a cellular phone (i.e., handset), a video game console, a PDA, a laptop computer, or a video or audio/video enabled device, and the wireless communication system 150 may be a CDMA system or a GSMC, among other wireless communication systems.

The wireless device 100 generally includes an antenna 102, a receiver 104, a transmitter 106, a digital section 110, a display unit 130, and a main memory 140. Bi-directional communications with a respective base station (not shown) of the wireless communication system 150 are provided via receive and transmit paths. In the receive path, signals transmitted by a base station (not shown) are received by the antenna 102 and provided to the receiver 104. The receiver 104 demodulates the received signals and forwards demodulated signals for further processing to the digital section 110. In the transmit path, the transmitter 106 acquires from the digital section 110 data to be transmitted, generates a carrier signal modulated by the data, and forwards the modulated carrier signal to the antenna 102 for transmitting to the base station (not shown).

The digital section 110 illustratively comprises a modem processor 112, a video processor 114, a controller/processor 116, a display processor 118, an Advanced RISC (reduced instruction set computer) Machine/digital signal processor (ARM/DSP) 122, a graphics processing unit (GPU) 124, an internal memory 126, an internal bus 120, and an external interface 128. In operation, elements of the digital section 110 are administered by the controller/processor 116.

The modem processor 112 performs processing (e.g., modulation/demodulation) of data provided by the receiver 104 or directed to the transmitter 106. The video processor 114 performs processing such as encoding/decoding, or codec, operations for video bitstreams (e.g., still or motion images) produced by video applications such as a camcorder, video playback, video conferencing, and the like. Correspondingly, the display processor 118 facilitates rendering of the decoded images on the display unit 130 of the wireless device 100.

The Universal Multimedia Modem (UMM) is an integrated multi-radio multi-format or multi-codec device or platform. The modem consists of transmitters, receivers and transceivers for various long-range wireless communication services capable of serving wide area networks, as well as various short range wireless communication services capable of establishing local area networks. These wireless communication services include but are not restricted to FLO, 3G (1×/EV-DO, WCDMA/UMTS, GSM/GPRS), UWB, WiFi or WLAN (802.11x). The codec supports a variety of audio-visual coding formats including but not restricted to H.264, MPEG-1/2/4, H.263, SVC; AAC, HE-AAC, AMR, EVRC etc. In addition, the UMM supports picoFLO air interface and picoFLO coding formats.

The modem processor 112 may include or interface with a UMM 113 to communicate short range broadcast or multicast in a picoFLO system 160, as will be described later. The UMM 113 is configured to allow the wireless device 100 to perform remote controlling of picoFLO terminals or other picoFLO nodes in accordance with embodiments of the present disclosure via a universal remote control application (URC APP) 142 that may be stored in memory 140 or downloaded from a communications server. The URC APP 142 provisions remote control functionality through the wireless device 100 such that it may be a universal remote control device within a picoFLO system and achieve ubiquitous multimedia.

The GPU 124, in combination with the ARM/DSP 122, facilitates graphics processing operations for the wireless device 100. The GPU 124 may be compliant, for example, with a document "OpenGL Specification, Version 1.0," Jul. 28, 2005, which is publicly available. This document is a standard for 2D vector graphics suitable for handheld and mobile devices, such as cellular phones and other referred to above wireless communication apparatuses. Additionally, the GPU 124 may also be compliant with OpenGL2.0, OpenGL ES2.0, or D3D9.0 graphics standards.

Functional elements of the digital section 110 may be fabricated as or include application specific integrated circuits (ASICs), RISCs, field programmable gate arrays (FPGAs), micro-controllers or microprocessors, among other types of integrated circuits.

Raw video bitstreams received or transmitted by the wireless device 100 are generally compressed using video coding techniques compliant with one or more of industry-adapted video compression and communication standards. In one embodiment, the raw video bitstreams are compliant with at least one MPEG/VC-1/H.264 standard. Decoding of MPEG/VC-1/H.264-compliant video bitstreams includes texture decoding in macroblocks of the respective frames and, in particular, determining of quantized coefficient data of the macroblocks.

Certain configurations described herein can be implemented using MediaFLO™ video coding for delivering real-time video services in TM3 systems using the FLO Air Interface Specification, "Forward Link Only (FLO) Air Interface Specification for Terrestrial Mobile Multimedia Multicast", published as Technical Standard TIA-1099, which is fully incorporated herein by reference for all purposes.

The techniques described herein provision ubiquitous multimedia. Ubiquitous multimedia refers to the presence, availability and access to multimedia data or content at anytime, anywhere (or nearly anywhere). The ubiquitous multimedia is effectuated in part based on techniques for provisioning a remote control mode of a wireless (communication) device 100.

The term picoFLO refers to a short range broadcast, multicast or unicast using FLO physical and media access control (MAC) layers. A picoFLO network refers to a digital home automation system in which short range broadcast, multicast or unicast communications selectively take place between multimedia sources within the picoFLO network. A picoFLO system refers to a plurality of picoFLO networks interconnected via broadband networks or other networks and infrastructure. A picoFLO node (e.g. cell phone, pocket PC, laptop, etc.) has onboard multimedia processors and is adapted to receive picoFLO data within a picoFLO network and system and consume the data or forward data to a picoFLO terminal(s) and picoFLO server. A picoFLO terminal is a playback device adapted to receive data within a picoFLO network and consume the data within the device. (e.g. displays, speakers, TV, etc.) A pico FLO logical channel is similar to FLO logical channels or MLCs with extensions for added functionality required by picoFLO as described here.

FIG. 1A shows a high-level block diagram of a wireless device 100 communicating in a first wireless communication system 150 using wireless/cellular communication standards and, alternately, a picoFLO system 160 (shown in phantom). The wireless device 100 is operable to communicate with two separate systems using different protocols and different functionalities. For example, if the wireless device 100 is a cellular phone, the primary functionality of the wireless device 100 is carryout phone calls and uses long range communications to communicate with the system 150. The wireless device 100 may include other functionality provided to cellular phones, laptops, etc., such as, without limitation, email and video capabilities. The wireless device 100 is operable as a universal remote control (URC) within the picoFLO system 160. In one aspect, as a universal remote control, the wireless device 100 may extend its audio and visual capabilities by controlling nearby picoFLO terminals or picoFLO nodes with a display monitor and/or speakers to display or audibly output communications of the wireless device 100 or other multimedia sources (picoFLO nodes) within the system 160.

Figure 2:
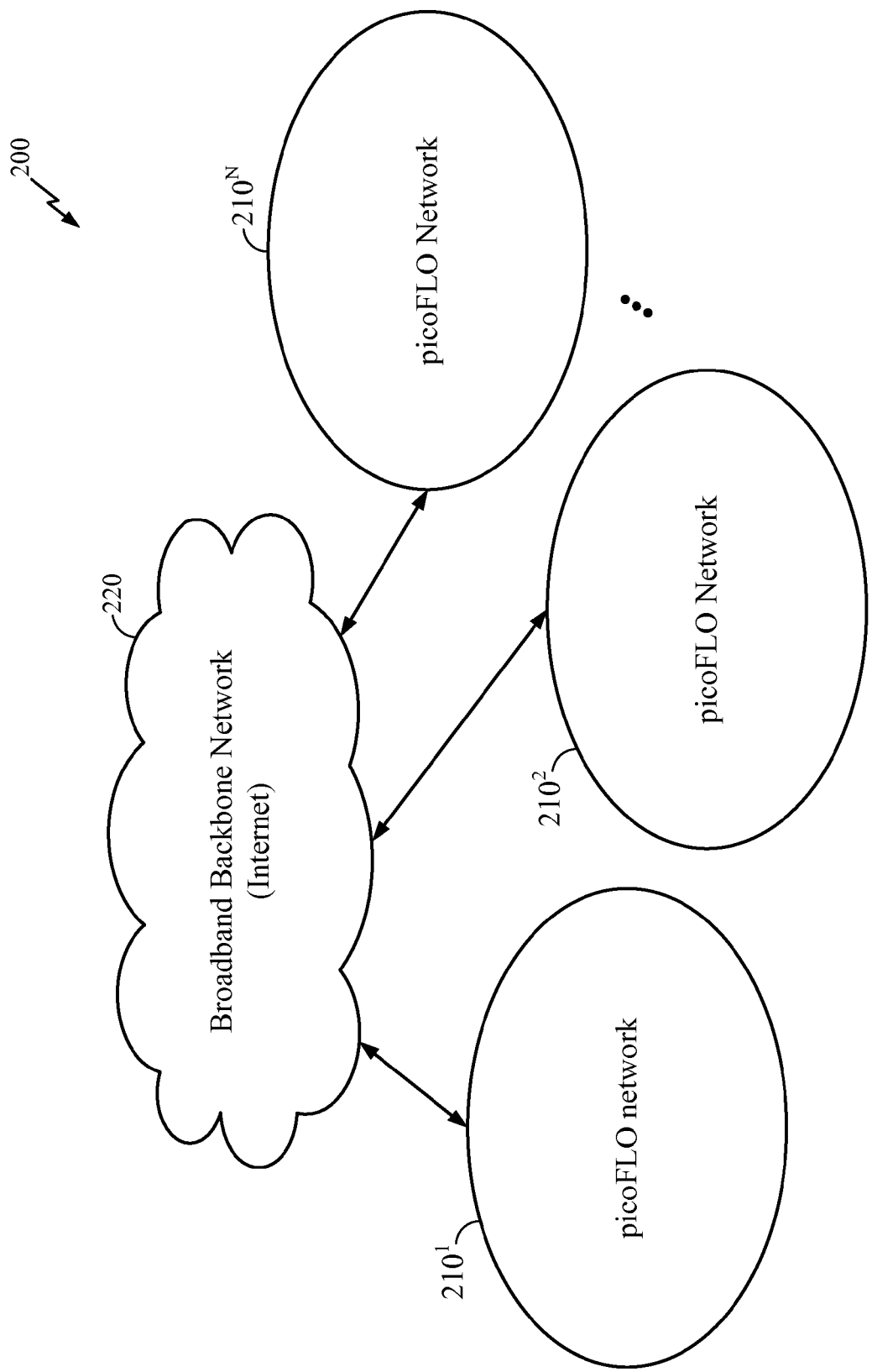
FIG. 2 shows a high-level block diagram of a picoFLO system.

FIG. 2 shows a high-level block diagram of a picoFLO system 200. The picoFLO system 200 comprises a plurality of picoFLO networks $210^1, 210^2, \ldots 210^N$ each having one or more multimedia sources (FIG. 3) some of which have data multiplexed via a picoFLO air interface 408 (FIG. 4). In order to enable true universal connectivity between multimedia sources, the plurality of picoFLO networks $210^1, 210^2, \ldots 210^N$ are connected (via wired or wireless medium such as cable modem, WLAN/LAN) to existing broadband backbone networks 220 and thus the picoFLO networks $210^1, 210^2, \ldots 210^N$ can communicate with each other allowing access to multimedia data anywhere, anytime. Note that DRM issues can be resolved by using secure access to preferred picoFLO networks $210^1, 210^2, \ldots 210^N$ through known security methods (e.g. key management, DRM, encryption, etc.).

Each of the picoFLO networks $210^1, 210^2, \ldots 210^N$ is a digital home (or office) network with a service area having a limited air range or footprint (cell boundary). In one configuration, the limited air range or footprint may be limited to a residence or office.

The concept of the picoFLO system 200 may be extended to be compatible with other fixed and mobile broadband networks such as WiFi, WiMax, UWB and UMB and LTE. Unlike MediaFLO™ communications within a broadcast network, the picoFLO system 200 may enable communication of audio-visual or multimedia data in simplex and duplex modes. The picoFLO system 200 can be configured to operate as TDD or FDD or CDD. The CDD may not be restricted to a PN code as in CDMA.

In order to extend the scope and application of the picoFLO system 200 further, when included with the multiple connectivity protocols, the picoFLO system 200 may make use of various other radio protocols and multimedia codecs and graphics engines (i.e. GPU 124) employed in a readily available wireless device (i.e. wireless device 100) to enable seamless multimedia. Thus, the URC APP 142 may interface with and make use of the various other radio protocols and multimedia codecs and graphics engines (i.e. GPU 124).

Figure 3:
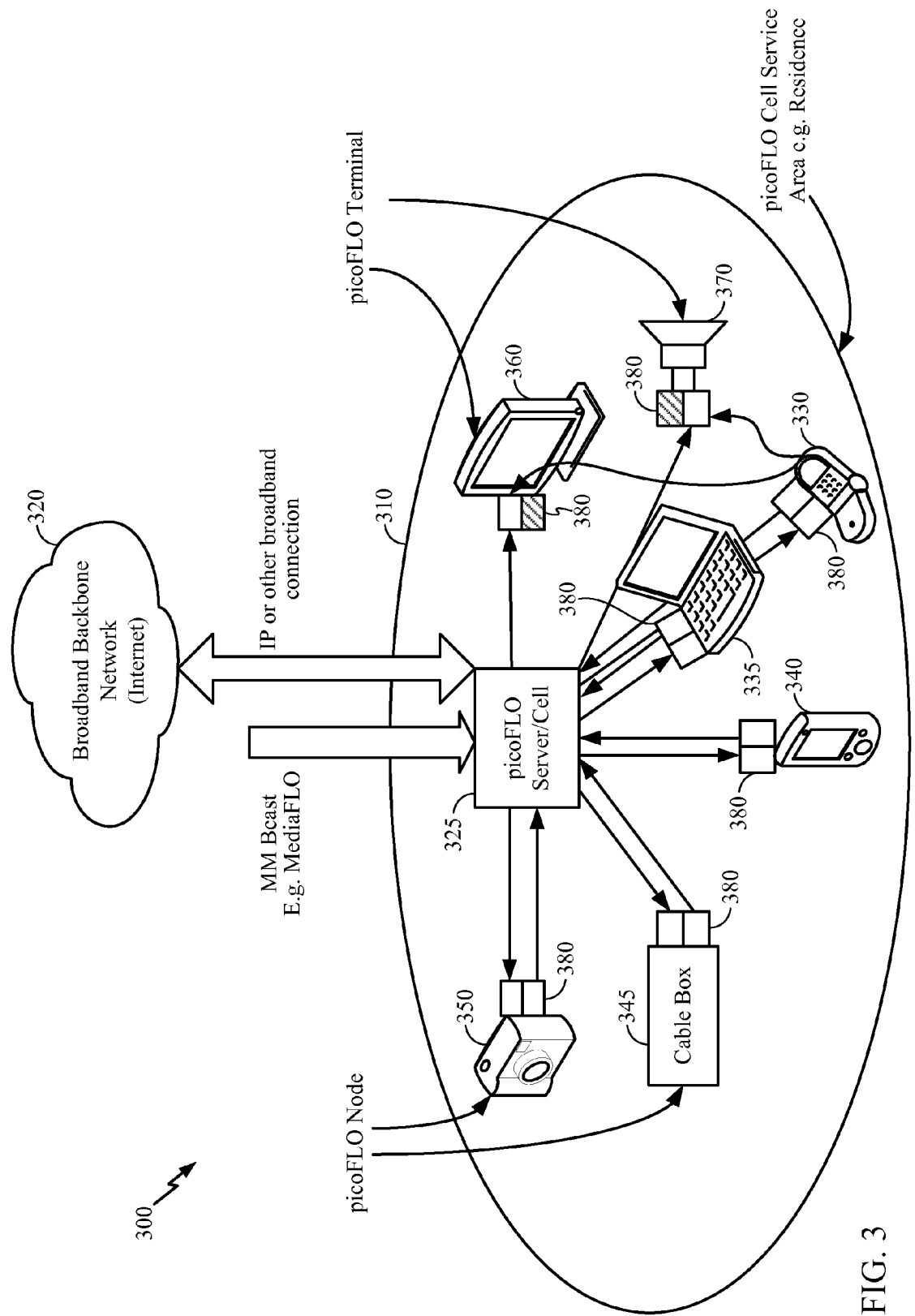
FIG. 3 shows a block diagram of a picoFLO network in a picoFLO system.
Figure 4:
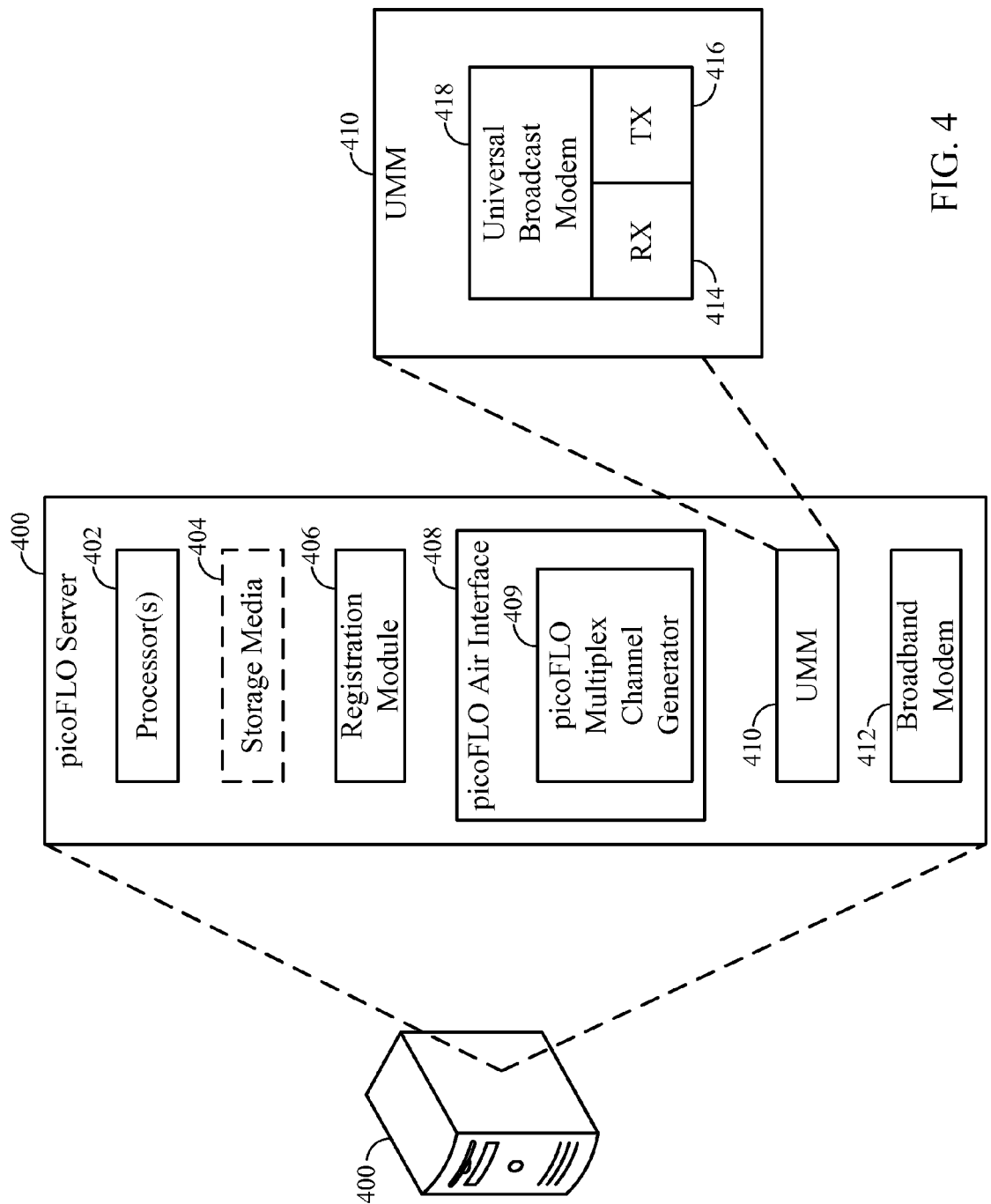
FIG. 4 shows a block diagram of a picoFLO server with a universal multimedia modem.

FIG. 3 shows a block diagram of a picoFLO network 310 for use in a picoFLO system 300. The picoFLO network 310 comprises a picoFLO server 325 and one or more picoFLO nodes 330, 335, 340, 345 and 350 communicating over a picoFLO multiplex channel 600B (FIG. 6B) within the picoFLO network 310. The picoFLO server 325 can be hosted (or co-hosted) in a STB and communicates with the broadband networks 320. The picoFLO network 310 further comprises one or more picoFLO terminals 360 and 370. The one or more picoFLO terminals 360 and 370 and the one or more picoFLO nodes 330, 335, 340, 345 and 350 are equipped with UMMs 380. picoFLO nodes and picoFLO terminals may also be referred to as picoFLO receivers.

A picoFLO node may be a communication device such as a cell phone, pocket PC, laptop and the like which is capable of receiving picoFLO data from a picoFLO network or picoFLO server. A picoFLO node is also capable of consuming received data within the device or further forwarding the data to a picoFLO terminal or another picoFLO node. A picoFLO terminal may be a device capable of receiving data from a picoFLO network, either from the server or a picoFLO node and consuming the data within the device. Examples of picoFLO terminals are displays, speakers, TV etc.

The picoFLO nodes 330, 335, 340, 345 and 350 receive multimedia data and related metadata (other forms of data) from the picoFLO server 325. The picoFLO nodes 330, 335, 340, 345 and 350 consume (playback or store) received data based on the primary capabilities of the node. For example, devices with display/speakers can playback content upon request while storage devices such as a DVR can store received data for future consumption/re-broadcast. The picoFLO nodes 330, 335, 340, 345 and 350 are operable to configure, via a universal remote control function, a picoFLO terminal via the UMMs 380 when the node is within proximity to the picoFLO terminal. Furthermore, one or more of the picoFLO nodes 330, 335, 340, 345 and 350 are operable to configure a picoFLO node via the UMMs 380 when the two picoFLO nodes are within proximity of the other.

FIG. 4 shows a block diagram of a picoFLO server 400 with a universal multimedia modem (UMM) 410. The picoFLO server 400 may be fixed and may be powered by a public utility company through a wall socket. Thus, the picoFLO server 400 should not have any limiting power constraints. The server 400 includes high performance processors 402 and has Internet/high-speed broadband connectivity modem 412 for connection to existing broadband backbone networks 320 (e.g. Internet). The server 400 further includes a storage media 404 and a registration module 406 for registering picoFLO nodes 330, 335, 340, 345 and 350 and/or picoFLO terminals 360 and 370. The storage media 404 may be sufficiently to enable the picoFLO server to support DVR functionality. The storage media 404 may be internal to the server 400 or external and connected to the server via a high speed interface. Nonetheless, additional storage in an external storage media may also be employed. The server 400 may also include a COTS or general purpose processor board with a fast bus. The server 400 further comprises a picoFLO air interface 408 having a picoFLO multiplex channel generator 409 and a UMM 410. The operation of the picoFLO air interface 408 will be described in relation to FIGS. 6A and 6B.

In one configuration, the picoFLO server 400 may receive multimedia data from the picoFLO nodes 330, 335, 340, 345 and 350 using wireless personal area network communications such as UWB. The picoFLO server 400 may also receive broadcast data (e.g. MediaFLO). The picoFLO server 400 compiles index information for each category of data or node. The picoFLO server transmits data, which includes multimedia data, over picoFLO logical channels which may correspond to one of physical or MAC layer channels. The index information can be transmitted in co-located or independent channels or picoFLO logical channels with primary data. Furthermore, the picoFLO server 400 may transcode the multimedia data into picoFLO formats.

The UMM 410 may be embedded in the server or made available on a dongle via a medium to high speed wired or wireless interface. An example form factor for the dongle is similar to a memory stick with a USB interface. The UMM 410 includes a picoFLO receiver (Rx) 414 and picoFLO transmitter (Tx) 416 and a UMM 418. The UMMs for the picoFLO nodes 330, 335, 340, 345 and 350 and the picoFLO terminals 360 and 370 are generally the same as or similar to the UMM 410. However, when a UMM 410 is coupled to one or more picoFLO terminals 360 and 370 only the receiver (Rx) 414 is enabled and the transmitter (Tx) 416 may be disabled, such as after registration. The transmitter is on for registration and is disabled AFTER registration as described above. In another embodiment, the picoFLO server may perform polling of the available pFLO receivers in the network to establish registration or re-establish communications.

Referring now to FIG. 3, the UMM 380, coupled to the one or more picoFLO terminals 360 and 370, is constructed and arranged to be configured and/or controlled by other picoFLO nodes 330, 335, 340. The UMM 380, coupled to the one or more picoFLO nodes 330, 335, 340, 345 and 350, may be constructed and arranged to be configured and/or controlled by other picoFLO nodes 330, 335, 340, 345 and 350. The UMM 380 is similar to the UMM 410. The primary difference between a picoFLO terminal and a picoFLO node is that the terminal is a playback device without the need for an onboard processor. For example, picoFLO terminal 360 is a display monitor and picoFLO terminal 370 is speakers.

The multimedia data or content 608A, includes one or more streams of audio and video data. Some channels may carry audio data only or combinations of one or more audio streams for different languages corresponding to a video stream. The picoFLO terminal may consume only one of audio or video streams. For example, in the case of a display monitor, it may receive and consume only the video stream from a picoFLO logical channel and in the case of speakers, only audio streams from the picoFLO logical channel may be consumed. In the case of TV, both audio and video streams may be received by the picoFLO terminal and consumed. The audio streams corresponding to a video stream may be transmitted in the same or separate picoFLO logical channels that the video stream is transmitted in.

The picoFLO system 300 employs UMMs 380 and 410 which provide the high level of integration required for seamless connectivity and multimedia access. The server 325 communicates to the one or more picoFLO terminals 360 and 370 and the one or more other picoFLO nodes 330, 335, 340, 345 and 350 within the picoFLO network 310 via the UMMs 380 and 410 through the picoFLO air interface 408. The picoFLO air interface protocol is an extended version of the FLO format. The server 400 is further operable to receive mobile TV content via MediaFLO, DVB-H or ISDB-T using a UBM 418 in the UMM 410 which may be further distributed to picoFLO terminals or nodes.

Figure 5:
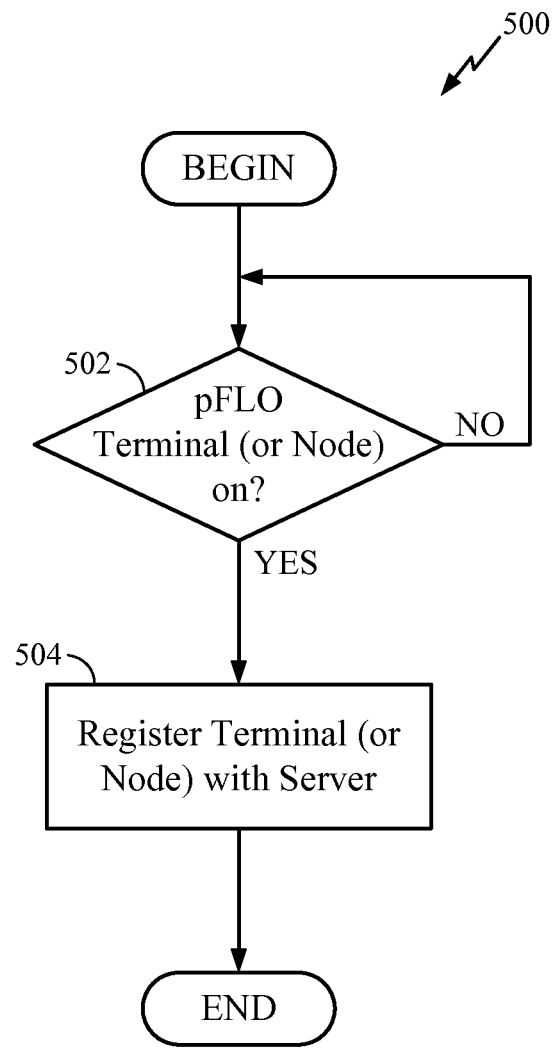
FIG. 5 shows a flowchart of a process for registration in the picoFLO network.
Figure 6A:
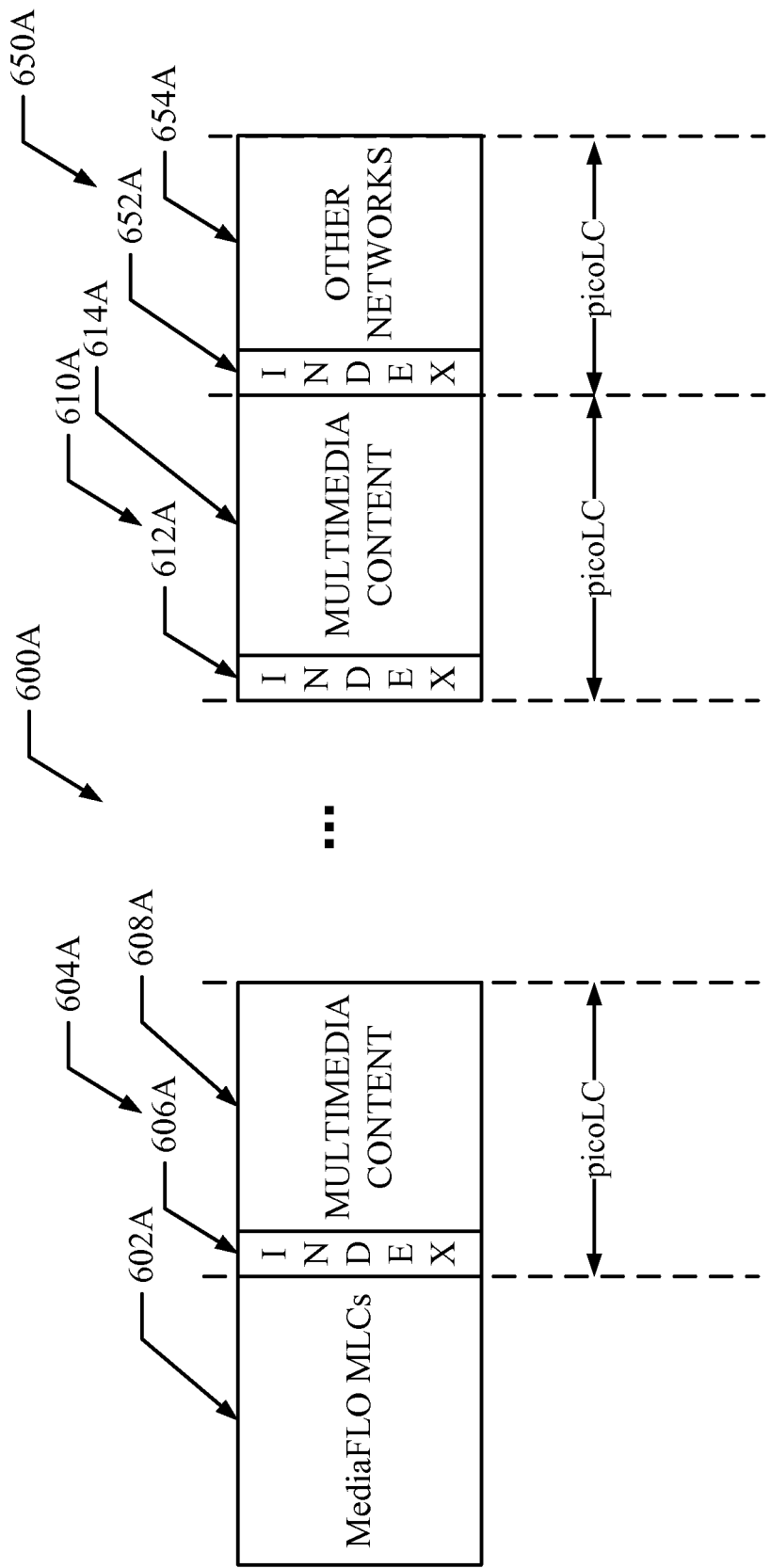
FIG. 6A shows a picoFLO multiplex channel for a picoFLO network.
Figure 6B:
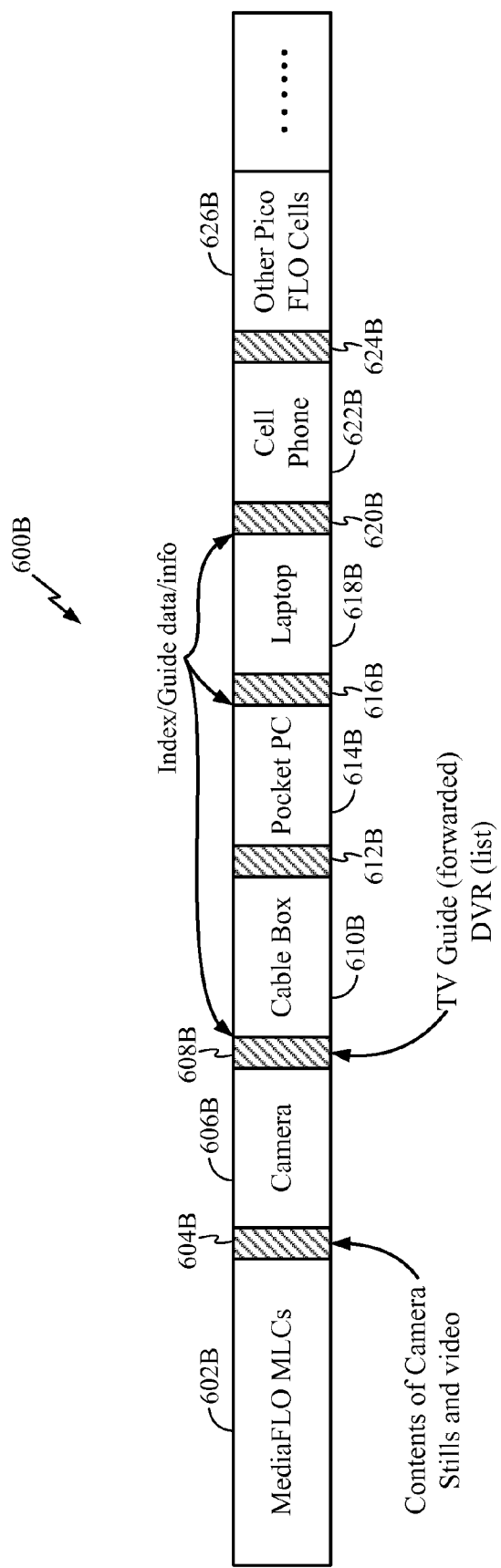
FIG. 6B shows a picoFLO multiples channel for the picoFLO network of FIG. 3.

FIG. 5 show a flowchart of a process for registration in the picoFLO network. The process 500 begins at block 502 where a determination is made whether a picoFLO terminal or picoFLO node is on. If the determination is "NO," the process 500 loops back to the beginning. However, if the determination is "YES," then the picoFLO terminal or picoFLO node is registered with the server 400 at block 504. The process 500 may be carried out at least in part by the registration module 406. The registration module 406 would generate a registered list of currently registered picoFLO terminals and/or picoFLO nodes. The picoFLO air interface 408 would use the registered list when generating the picoFLO multiplex channel 600A or 600B (FIG. 6A or 6B).

When a picoFLO node 330, 335, 340, 345 and 350 becomes active in the picoFLO network 310, the node initiates (real-time) transfer of data to the picoFLO server 325. The picoFLO server 325 could initiate communications with the picoFLO nodes 330, 335, 340, 345 and 350 in a manner similar to those during initial setup.

The picoFLO nodes 330, 335, 340, 345 and 350 or the universal remote controller (URC) can communicate with the picoFLO server 325 to obtain from the system configuration files, in memory, of the picoFLO server 325 the active set of picoFLO terminals 360 and 370 or picoFLO nodes 330, 335, 340, 345 and 350.

Returning again to FIG. 3, the picoFLO nodes 330, 335, 340, 345 and 350 are operable to transmit over a UWB or other short range/broadbands stored content to the server 325. The picoFLO nodes 330, 335, 340, 345 and 350 comprise a cellular phone, a laptop, a Pocket PC, a cable box, and a digital camera, respectively. For example, when picoFLO node 350 (e.g. a digital camera) with a UMM 380 receives a trigger from the server 325, the picoFLO node 350 will transmit index information (list of files, size, time stamp, etc.) and files to the server 325 in an uplink. The server 325 then re-broadcasts the node's index information in a picoFLO logical channel allocated for the picoFLO node 350 (e.g. a digital camera) via the picoFLO air interface 408. Hence the server 325 generates a larger multiplex channel 600A that may also include the channels available from the mobile TV broadcast channels (NOT SHOWN) and a picoFLO logical channel for each picoFLO node 330, 335, 340, 345 and 350 registered with the picoFLO server 325 at any current time (registered list). Each channel in the picoFLO multiplex channel 600A or 600B is assigned a picoLC. (The picoLC assignment can be static or quasi-static or dynamic).

FIG. 6A shows a picoFLO multiplex channel for a picoFLO network. The picoFLO multiplex channel 600A is transmitted by the picoFLO server 325. The picoFLO multiplex channel 600A includes various multimedia content from multiple sources (nodes) available in the picoFLO network 310. The picoFLO multiplex channel 600A comprises MediaFLO MLCs 602A to forward mediaflo service and a plurality of the logical channels (picoLC) 604A and 610A used for communication of data from the picoFLO nodes. Each picoLC 604A and 610A includes an index interval 606A and 612A, respectively, and a multimedia content portion 608A and 614A, respectively. Each index interval incorporates index information associated with the file or multimedia content in the multimedia content portion 608A and 614A. The picoLCs 604A and 610A are assigned based on those picoFLO nodes that are registered and may vary. The multiplex channel 600A further includes picoLC 650A for other picoFLO networks. The picoLC 650A includes an index 652A and multimedia content 654A.

According to one configuration, the picoFLO server 325 transmits the multiplex channel 600A as a broadcast. As a result, every picoFLO node and picoFLO terminal on the network and in communication with the picoFLO server 325 will receive the multiplex channel 600A. Yet, according to another configuration, the picoFLO server 325 transmits the multiplex channel 600A as a multicast, thereby directing the multiplex channel 600A to just select picoFLO nodes and picoFLO terminals on the network.

FIG. 6B is a specific example of a picoFLO multiplex channel 600B. The picoFLO multiplex channel 600B comprises MediaFLO MLCs 602B, a camera picoLC 606B, a cable box picoLC 610B, a pocket PC picoLC 614B, a laptop picoLC 618B, a cellular phone picoLC 622B and a picoLC 626B for other picoFLO networks. The each picoLC 606B, 610B, 614B, 618B, 622B and 626B includes an index interval 604B, 608B, 612B, 616B, 620B and 624B, respectively, followed by related multimedia content. This index in the index interval 604B, 608B, 612B, 616B, 620B and 624B may be created by the picoFLO server based on the received media data from each picoFLO node (through media categorization techniques such as MPEG-7) or exists in the picoFLO node and also sent to the picoFLO server along with the media data.

The index interval 604B includes an index of the contents of the camera's still images and/or video associated with digital camera data in the camera picoLC 606B. The index interval 608B may contain TV guide information or a forwarded DVR list associated with cable TV information in the cable box picoLC 610B. The index intervals 616B and 620B may includes an index or guide of data associated with the multimedia content from a registered laptop (e.g. picoFLO node 335) and a registered cellular phone (e.g. picoFLO node 330) in the picoLCs 618B and 622B, respectively. The index interval 624B may contain an index or guide to data from other picoFLO networks in the picoLC 626B. The index interval 612B may also contain an index or guide of data associated in the pocket PC channel 614B.

Figure 7A:
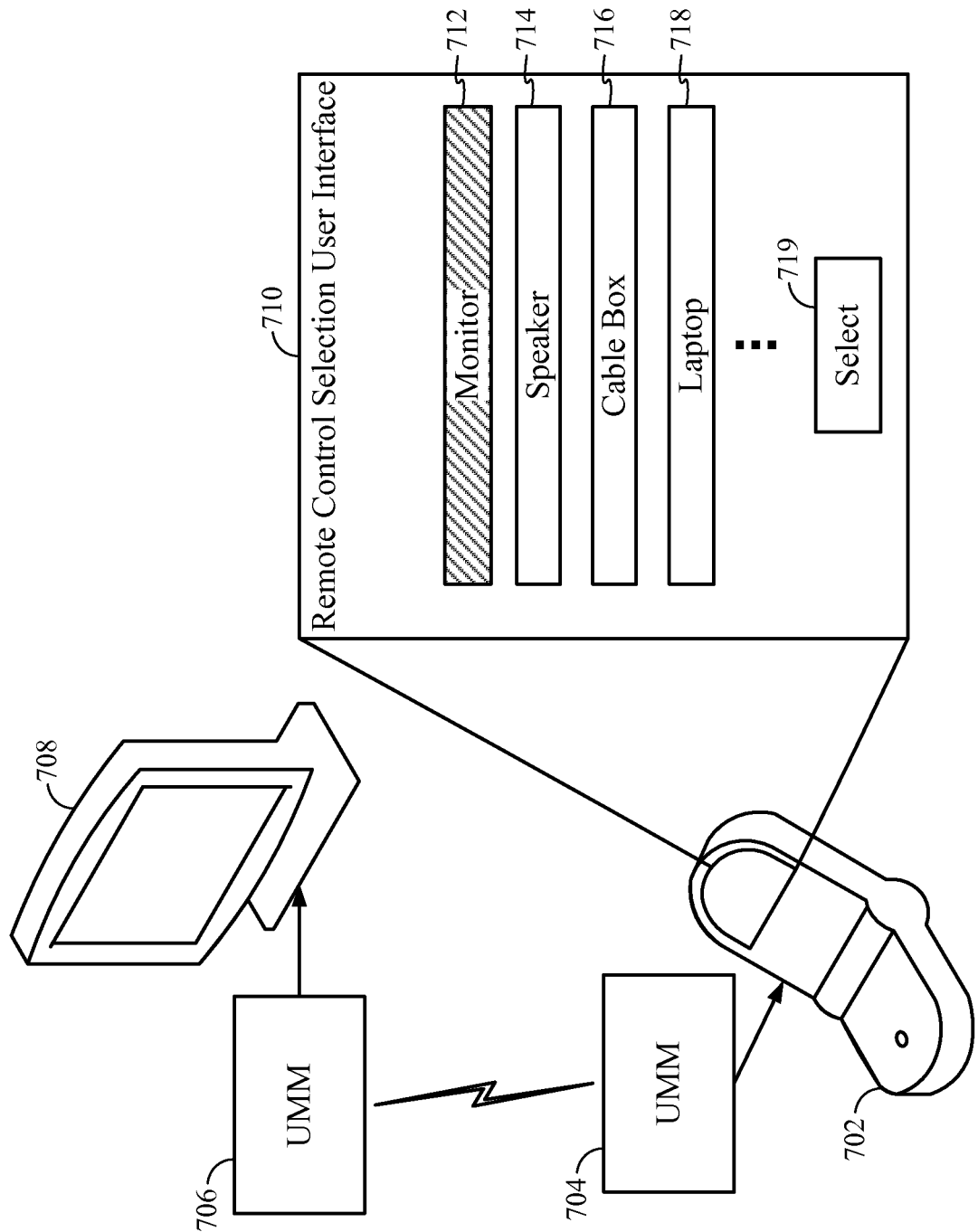
FIG. 7A shows a cellular phone remotely controlling a monitor in the picoFLO network of FIG. 3.

FIG. 7A shows a cellular phone 702 remotely controlling a monitor 708 in the picoFLO network 310 of FIG. 3. The cellular phone 702 (i.e. picoFLO node 330) has embedded or coupled thereto a UMM 704. The UMM 704 is operable to be in wireless communication with UMM 706 embedded or coupled to monitor 708 (i.e. picoFLO terminal). The cellular phone 702 executes instructions via the URC APP 142 (FIG. 1C) to display a remote control selection user interface (RC-SUI) 710. The RC-SUI 710 provides the cellular phone 702 with a list of currently registered picoFLO terminals and picoFLO nodes and a field for highlighting or selecting a respective registered picoFLO terminal or picoFLO node in which to remotely control. Here the list includes monitor entry 712, speaker entry 714, cable box entry 716 and laptop entry 718. In this example, the monitor entry 712 is shown highlighted. The RC-SUI 710 also includes a select button 719 to place a selection. Nonetheless, other means for providing a user with a user interface (UI) in which to control a plurality of picoFLO nodes or picoFLO terminals may be provided. For example, a designated key on the keypad or icon on a display of the cellular phone 702 may be used to automatically select an entry via key assignment.

Figure 7B:
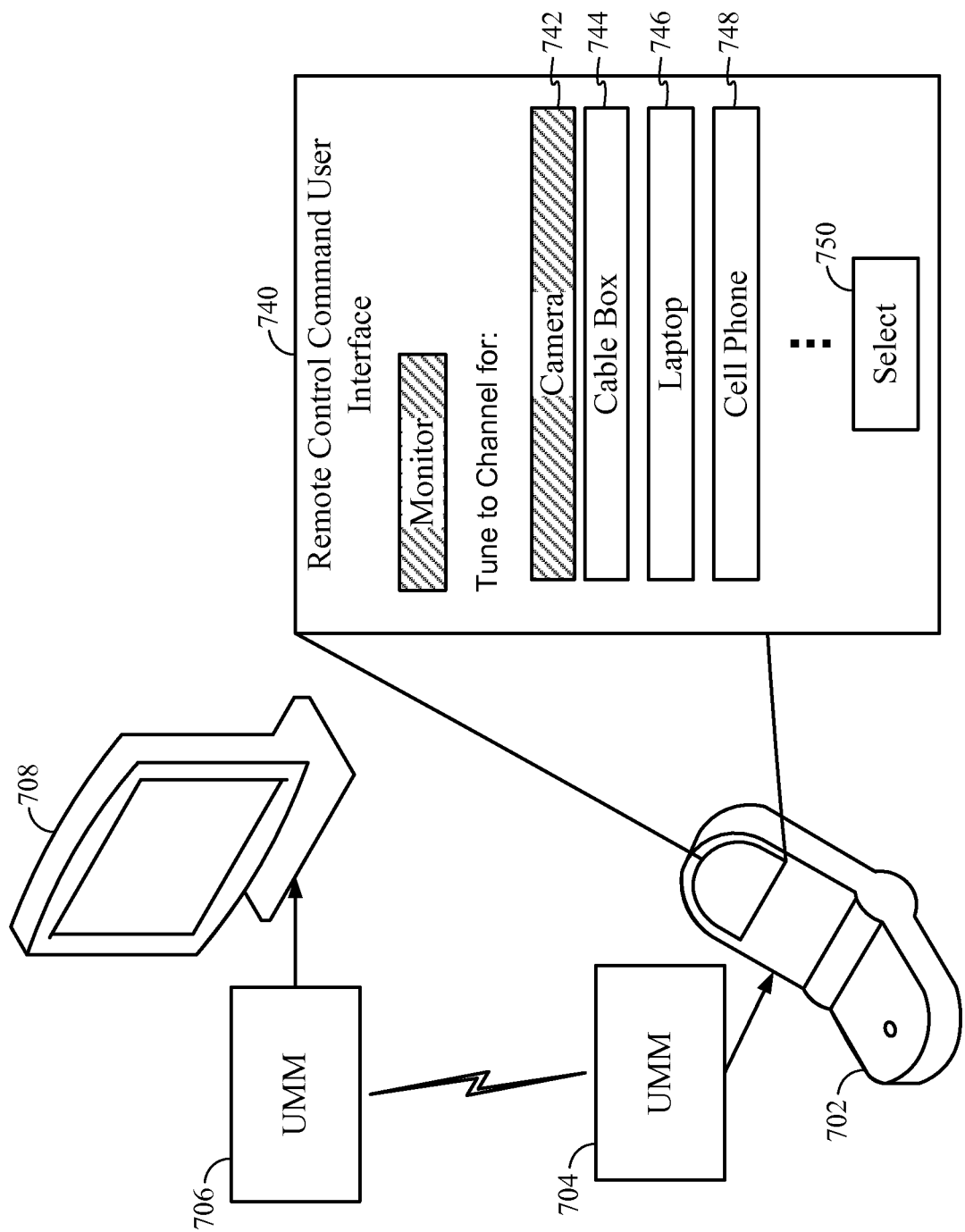
FIG. 7B shows a cellular phone generating a remote control command.

FIG. 7B shows a cellular phone generating a remote control command. In this example, a monitor was selected to be controlled. A remote control command user interface (RCC-UI) 740 is provided to allow the cellular phone 702 to generate a remote control command to the monitor 708 via the URC APP 142. The RCC-UI 740 would allow the user to select which picoLC in the picoFLO multiplex channel 600B the UMM 706 should tune to or receive. In this example, the user has selected a camera entry 742 which is a registered picoFLO node. Other entries include cable box 744, Laptop 746 and cellular phone 748, all of which are currently registered picoFLO nodes. A Select button 750 is provided. However, other means of selecting available options may be used such as via key assignment on a keypad of the cellular phone 702

Figure 7C:
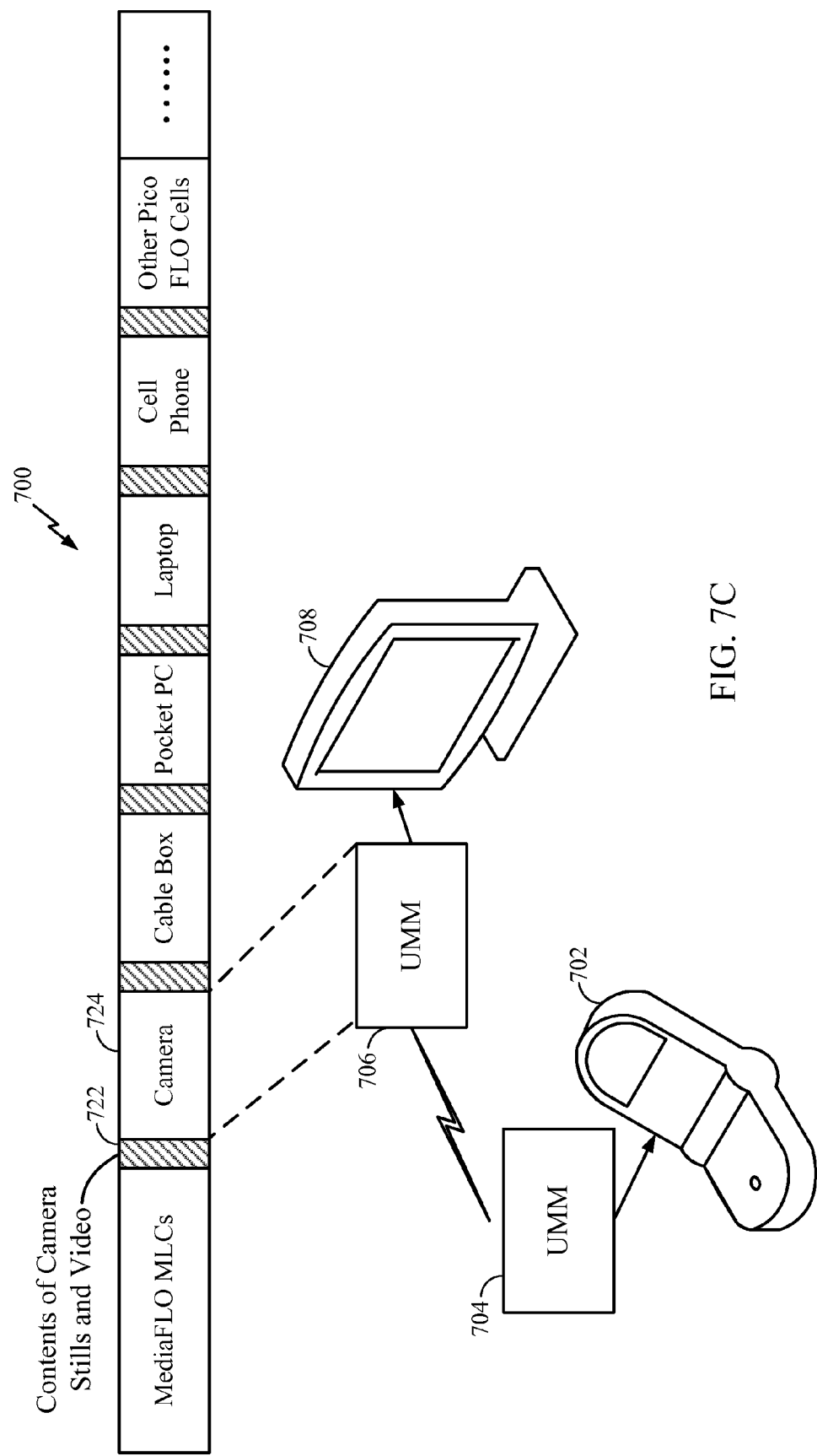
FIG. 7C shows the terminal receiving data from the picoFLO multiplex channel of FIG. 6B.

FIG. 7C shows the terminal (monitor) receiving data from the picoFLO multiplex channel 700. After, the UMM 706 receives the remote control command (instructions to cause the UMM 705 to receive or re-tune to a particular picoLC). In one configuration, the UMM 706 would receive a unicast signal from UMM 704 when receiving remote control commands. Thus, the UMM 706 is tuned to receive the unicast signal. The remote control command then instructs the UMM 706 to re-tune to or receive the index information in 722 and related camera data in the picoLC 724 so that camera data can be received and consumed.

Figure 8:
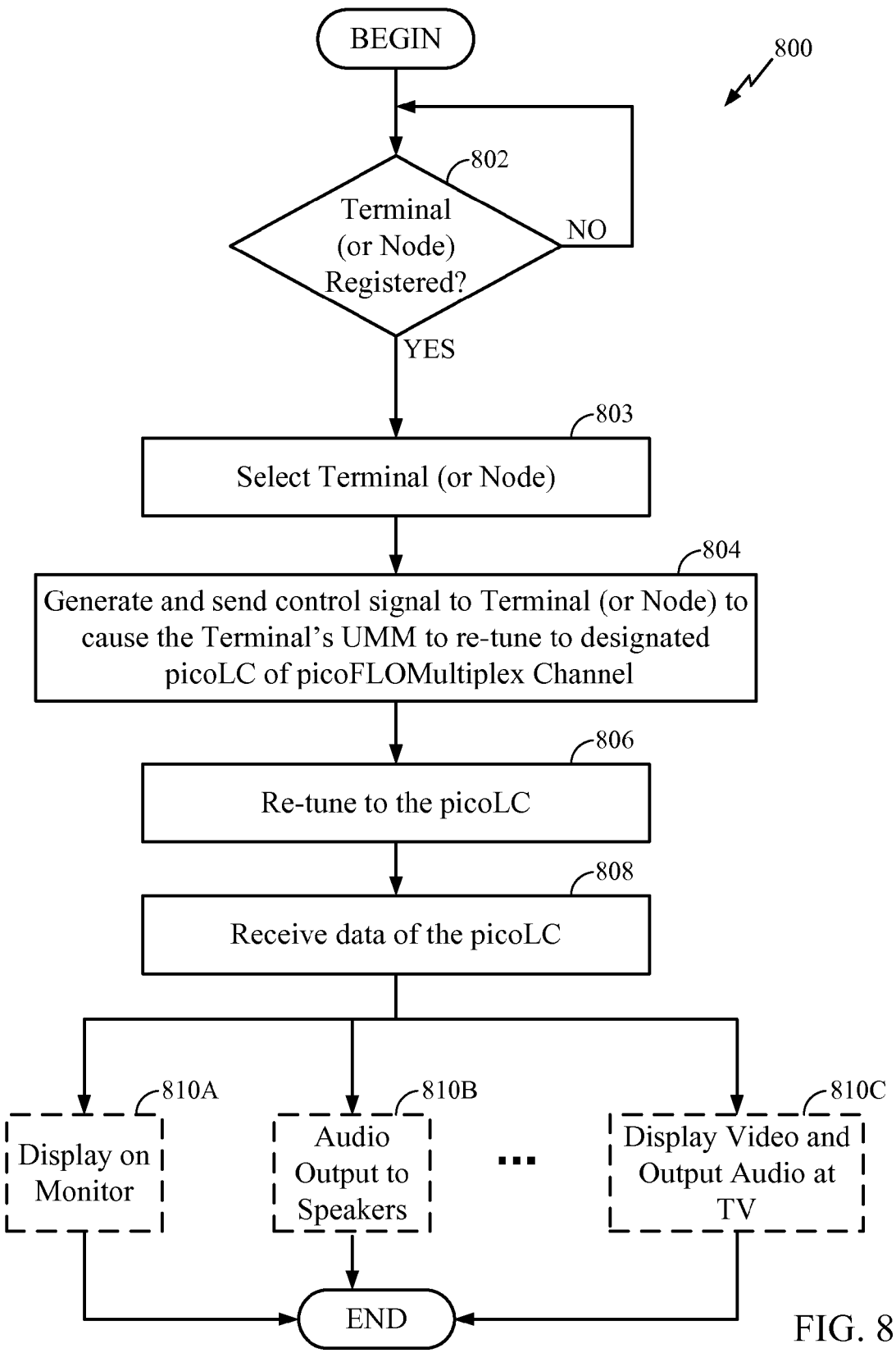
FIG. 8 shows a flowchart of a process for a picoFLO node remotely controlling a picoFLO terminal or another picoFLO node.

FIG. 8 shows a flowchart of a process for a picoFLO node remotely controlling a picoFLO terminal or another picoFLO node. The process 800 will be described in combination with FIGS. 7A-7C. The process 800 begins with block 802 where a picoFLO node (e.g. cellular phone 702) determines whether a particular picoFLO terminal (e.g. monitor 708) or other picoFLO node is currently registered. If the particular picoFLO terminal (e.g. monitor 708) or other picoFLO node is not registered, the process loop back to the beginning. However, if the determination is "YES," the picoFLO node (e.g. cellular phone 702) can then remotely control the picoFLO terminal (or other picoFLO node). At block 803, a picoFLO terminal or picoFLO node is selected. The picoFLO node (e.g. cellular phone 702) generates and sends a remote control command via the UMM 704 to the UMM 706 connected to the picoFLO terminal (i.e. monitor 708) at block 804. The remote control command may be representative of a signal to cause the picoFLO terminal to re-tune, select or receive a particular node's channel. At block 806, the UMM 706 of the picoFLO terminal will re-tune to the designated node channel 724. At block 808, the picoFLO terminal will receive the node's picoLC 724. Prior to receiving the data of the node's picoLC 724, the UMM 706 may receive the index interval 722. Block 810A, 810B or 810C are shown in parallel to indicate that any one of the terminals or nodes being remotely controlled would consume the data content in the received node's channel 724.

After the picoFLO terminal is re-tuned and receiving a selected multimedia content, the picoFLO terminal can subsequently be controlled to re-tune to something else such as in the middle of receiving the original selected multimedia content via a handshaking operation. The handshaking operation requires periodic updates of the picoFLO configuration information such as from the picoFLO server.

As an example, a cellular phone 702 has a relatively small display screen as compared to monitor 708. Thus, when remotely controlling the terminals or nodes, the cellular phone 702 extends it display to that of the monitor 708. The cellular phone 702 may extend its audio capability by sending audio to speakers. The speakers may be part of a stereo system or other devices with speakers.

In one mode of operation, the display of the cellular phone 702 may be extended such to a wireless display. In the picoFLO multiplex channel there is a picoLC (channel) for content of the cellular phone 702. The picoLC may include pictures or video clips stored in the cellular phone 702 sent to the picoFLO server 325 from the cellular phone 702 and subsequently received by a picoFLO terminal. When the cellular phone 702 uploads its information to the picoFLO server 325 (via a mutual WPAN such as WiFi), the cellular phone 702 acts as any other picoFLO node). However, when the picoFLO server 325 receives and multiplexes the data received from the cellular phone 702, the picoFLO server 325 allocates one or more (e.g. one for stills, one for video) picoLCs to the cellular phone's data.

Any node or terminal, including the cellular phone, that receives the broadcast of the picoFLO multiplex channel from the picoFLO server, can see a reference to the picoLC corresponding to the multimedia data for the cellular phone in a picoFLO guide. Upon selection, the UMM automatically re-tunes to the picoLC for the cellular phone.

Each of the picoLCs (e.g. camera 724) includes multimedia content and an index interval 722 or index preamble. The monitor 708 then displays the preamble and the cellular phone 702 (serving as a universal remote controller) can then select the item/file from the index. In one embodiment, the terminal displays the index from the multiplex corresponding to the picoFLO logical channel it is tuned to. The selection is communicated back to the picoFLO server 325 which in turn requests the camera (picoFLO node 350) to transmit the selected file. The camera (picoFLO node 350) then streams the file via UWB or another broadband access network to the picoFLO server 325. Then the file is multiplexed on the picoFLO multiplex channel 700. There is probably an end-to-end delay of a few 100 milliseconds but it is not observed beyond the selection delay at the monitor 708. The monitor 708 receives the camera file stream and presents or plays the image or video content. Similarly, other media capable devices such as camera, camcorder, voice recorder, MP3 players, etc., can become picoFLO capable with a UMM dongle or software plug-in. In addition to accessing content from picoFLO terminals or nodes, the content available through the STB or DVR can also be included in the picoFLO multiplex channel 700. All picoFLO nodes may have access to all multimedia data of other picoFLO nodes.

Async-Duplex media communications may take place to enable ubiquitous access to multi-media content in a picoFLO network 310. In one configuration the uplink is a unicast signaling format provided by any existing or future broadband technology (Bluetooth, UWB, Wireless USB, WiFi, etc.) and the downlink signaling format is a broadcast/multicast medium. A unicast is a one to one communication. In a broadcast mode, the signal is transmitted to all the devices in the network, while in a multicast mode, the signal is transmitted to just select devices in the network. The multimedia data from the uplink is available over the picoFLO network 310 with minimum delays (only limited by the MAC in repackaging the uplink data onto a downlink logical channel). If MediaFLO™ were extended, this latency is on average 1 sec. and a max of 2 secs. If a 1 sec. superframe were used, this would enable real-time or quasi real-time access to content—i.e. anytime, anywhere.

Figure 9:
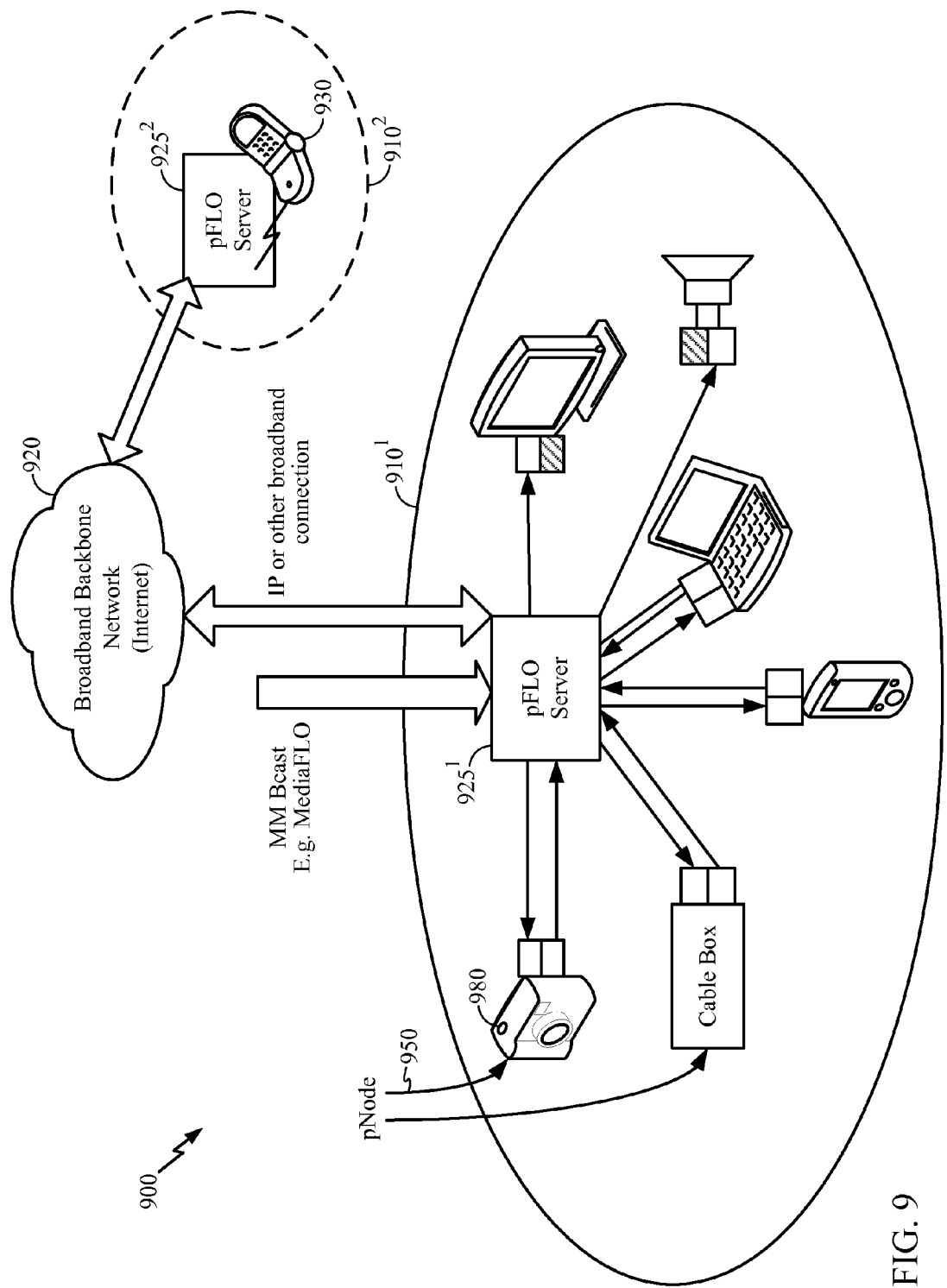
FIG. 9 shows a block diagram of a picoFLO node of a home network accessing other nodes or terminals in the home network from a remote picoFLO network.

FIG. 9 shows a block diagram of a picoFLO node (i.e. cellular phone) 930 of a home picoFLO network $910^1$ accessing other picoFLO nodes or picoFLO terminals in the home network $910^1$ from a remote picoFLO network $910^2$. In order to enable remote access, the home picoFLO network $910^1$ is accessible over the broadband networks 920 (e.g. Internet) when the picoFLO servers $925^1$ and $925^2$ are connected to the broadband backbone networks 920. In a remote picoFLO network $910^2$, picoFLO node 930 (cellular phone) could pull up any home media—images, video—at your friends house (remote picoFLO network $910^2$) by accessing the picoFLO server $925^1$ at home via the picoFLO server $925^2$ and broadband network 920. Thus, the other networks channel may be tuned to receive and consume multimedia content from the home picoFLO network $910^1$ in the remote picoFLO network $910^2$.

Thus a picoFLO node (i.e. cellular phone) 930 becomes a universal remote control for all media capable devices in a picoFLO system 900 and is capable of controlling and configuring all picoFLO nodes and picoFLO terminals in a picoFLO system 900. A picoFLO node (i.e. cellular phone) 930 with a UMM can function as a true universal remote control and can control any device at home in a digital home automation environment or elsewhere and thus provides ubiquitous multimedia access.

The a picoFLO node (i.e. cellular phone) 930 is a terminal that has a processor that can re-tune itself whereas a terminal is typically quasi-statically configured to tune to a particular picoLC in the picoFLO multiplex channel and can be re-tune using a picoFLO node. For example, the universal remote controller (i.e. cellular phone) 930, contacts the picoFLO server to request service. Any picoFLO node or terminal may be required to be "subscribed" to the picoFLO server. If not, during an initial setup of the picoFLO system, the picoFLO server and its nodes and terminals are configured using system parameters of the picoFLO system such as the server ID, physical channel (frequency) of operation of the system, version of the picoFLO server, etc. on the server side and node/terminal ID, version of the picoFLO node/terminal, etc. on the node/terminal side.

Furthermore, once the picoFLO terminals have been registered with the picoFLO server, the picoFLO terminals may also be configured (quasi-statically) to re-tune to a given picoLC of the picoFLO multiplex channel broadcast by the picoFLO server (e.g. the monitor/TV/display embedded in the refrigerator in the kitchen could, by default, be set to be tuned to the food network channel of the MFLO forwarded program channels in the broadcast of the picoFLO multiplex channel).

The picoFLO nodes on the other hand, when required (at the control of the picoFLO node) can invoke a picoFLO application, a picoFLO demodulator on the picoFLO node is then initialized and the receiver starts to receive a picoFLO signal. After physical layer acquisition of the picoFLO signal, the picoFLO node then receives the program guide of the picoFLO multiplex channel that the picoFLO server is broadcasting. When the user of the picoFLO node selects a program from the program guide, the picoFLO node starts to receive the picoLC's for the selected program channel from the picoFLO multiplex channel.

Some picoFLO nodes can also remotely control terminals in the picoFLO system. The picoFLO node, serving as a remote controller, contacts a picoFLO terminal via any of the available mutual short range wireless networks (WPAN) such as WiFi or Bluetooth. Since the picoFLO terminals and picoFLO nodes are configured as such each with its unique ID in the picoFLO system (during initial setup or via updates on the picoFLO server), the picoFLO node communicates with a picoFLO terminal over WPAN to read the picoFLO configuration information of the picoFLO terminal. (Optionally, the picoFLO node may read specific fields among the configuration settings). Reading a picoFLO configuration information maybe as simple as reading a pre-configured address in memory containing the picoFLO configuration information. The picoFLO node processes the received configuration information, looks up the desired program channel and corresponding picoFLO parameters (such as picoLC) and updates the picoFLO configuration information for the picoFLO terminal. For example, the update may include a copy of the information received from the picoFLO terminal. The picoFLO node then writes the modified configuration information to the (or different) pre-configured address in memory of the picoFLO terminal. The picoFLO terminal is setup to read this picoFLO configuration information from the pre-configured memory location on a periodic basis and apply the information to the picoFLO receiving application. This application may be part of the UMM and stored in the memory available in the UMM. The next time the picoFLO terminal updates its configuration, the picoFLO terminal begins to receive the re-tuned program channel.

The method of data exchange between the picoFLO node and picoFLO terminal for returning described above is a simplistic approach. There are several other similar methods possible that are unicast communication protocols. In one configuration, the universal remote control protocol does not have to be restricted to unicast communications between a picoFLO node and a picoFLO terminal. For a picoFLO terminal such as a digital picture frame that does not have a user interface (UI) (makes the device cumbersome, lowers aesthetic value, etc), picoFLO nodes can behave as their UI through the remote control protocol. Additionally, an unicast/memory reconfiguration may be based on data exchange.

The URC APP 142 is just another application among several others on the cellular phone. Hence the cellular phone can function as the URC while receiving one of the picoLC's or program channel from the picoFLO server. The cellular phone can display (or play on speakers for associated or audio only programs) the program being viewed on its embedded display while displaying the picoFLO terminal's info (program channel, etc.) as overlays on the display. The URC app 142 can be presented as a few lines of text/graphics overlayed on the display or the user can selectively switch to the picoFLO terminal's program channel to view what is currently being displayed by the picoFLO terminal.

The URC identifies which files to access at the camera for subsequent display by the picoFLO terminal or monitor using a camera index preamble available at the beginning (typically but can be anywhere and time division multiplexed) of the camera picoLC.

In exemplary embodiments, the processes may be implemented in hardware, software, firmware, or any combination thereof in a form of a computer program product comprising one or more computer-executable instructions. When implemented in software, the computer program product may be stored on or transmitted using a computer-readable medium, which includes computer storage medium and computer communication medium.

The term "computer storage medium" refers herein to any medium adapted for storing the instructions that cause the computer to execute the processes. By way of example, and not limitation, the computer storage medium may comprise solid-sate memory devices, including electronic memory devices (e.g., RAM, ROM, EEPROM, and the like), optical memory devices (e.g., compact discs (CD), digital versatile discs (DVD), and the like), or magnetic memory devices (e.g., hard drives, flash drives, tape drives, and the like), or other memory devices adapted to store the computer program product, or a combination of such memory devices.

The term "computer communication medium" refers herein to any physical interface adapted to transmit the computer program product from one place to another using for example, a modulated carrier wave, an optical signal, a DC or AC current, and the like means. By way of example, and not limitation, the computer communication medium may comprise twisted wire pairs, printed or flat cables, coaxial cables, fiber-optic cables, digital subscriber lines (DSL), or other wired, wireless, or optical serial or parallel interfaces, or a combination thereof.

The previous description of the disclosed configurations is provided to enable any person skilled in the art to make or use the disclosure. Various modifications to these configurations will be readily apparent to those skilled in the art, and the generic principles defined herein may be applied to other configurations without departing from the spirit or scope of the disclosure. Thus, the disclosure is not intended to be limited to the configurations shown herein but is to be accorded the widest scope consistent with the principles and novel features disclosed herein.

The invention claimed is:

1. A server for wirelessly distributing multimedia data to a plurality of registered devices on a local area network, comprising:
 a modem configured to receive multimedia data from each of the plurality of registered devices on the local area network, wherein the multimedia data comprises at least one of audio data, video data, and graphics data;
 a multiplexer for creating a multiplex signal that includes at least a portion of the received multimedia data from each of the plurality of registered devices; and
 a compiler for compiling index information from each of the plurality of registered devices,
 wherein the server transmits the multiplex signal to each of the plurality of registered devices located on the local area network using a multiplex channel comprising a plurality of logical channels, wherein each of the logical channels represents the multimedia data received from a different one of the plurality of registered devices on the local area network, wherein the multiplex channel includes a logical channel for each of the plurality of registered devices and an independent logical channel that contains the compiled index information that identifies the multimedia data contained in each logical channel of the multiplex signal.

2. The server of claim 1, wherein the modem utilizes a plurality of communication formats to communicate over at least one wide area network.

3. The server of claim 2, wherein the server receives multimedia data from one or more sources on a wide area network, and wherein the multiplex signal generated by the server includes at least one logical channel representing at least a portion of the multimedia data received from the one or more sources on the wide area network.

4. The server of claim 3, wherein the wide area network is a cellular telephone network.

5. The server of claim 3, wherein the wide area network is the Internet.

6. The server of claim 1, wherein the plurality of registered devices includes at least one of a mobile phone, a video game console, a personal digital assistant (PDA), a desktop computer, a laptop computer, a digital still camera, a digital video camera, a digital portable audio device, and audio/video enabled devices including televisions, digital video recorders (DVR) and portable entertainment devices.

7. The server of claim 1, wherein the multimedia data further comprises text data.

8. The server of claim 1, wherein at least one of the plurality of registered devices on the local area network comprises one or more terminals configured to receive the multiplex signal transmitted by the server and present select multimedia data contained within the multiplex signal to a user.

9. The server of claim 8, wherein at least one of the plurality of registered devices on the local area network comprises one or more nodes that are configured to receive at least a portion of the multiplex signal transmitted by the server, determine the multimedia content contained within the multiplex signal, and issue instructions to the one or more terminals indicating what multimedia data to present to a user.

10. The server of claim 9, wherein the one or more nodes determine the multimedia content of the multiplex signal by either parsing the multiplex signal or by analyzing the index information contained within the independent logical channel of the multiplex signal.

11. The server of claim 1, wherein the server is configured to transmit the multiplex signal in at least one of a broadcast, multicast or unicast mode.

12. A method of wirelessly distributing multimedia data to a plurality of registered devices on a local area network, comprising the steps of:
receiving multimedia data from each of the plurality of registered devices on the local area network, wherein the multimedia data comprises at least one of audio data, video data, and graphics data;
creating a multiplex signal that includes at least a portion of the multimedia data from each of the plurality of registered devices;
compiling index information from each of the plurality of registered devices; and
transmitting the multiplex signal to each of the plurality of registered devices on the local area network using a multiplex channel comprising a plurality of logical channels, wherein each of the logical channels represents the multimedia data received from a different one of the plurality of registered devices on the local network, wherein the multiplex channel includes a logical channel for each of the plurality of registered devices and an independent logical channel that contains the compiled index information that identifies the multimedia data contained in each logical channel of the multiplex signal.

13. The method of claim 12, further comprising at least one source of multimedia data that resides on a wide area network.

14. The method of claim 13, wherein the wide area network is the Internet.

15. The method of claim 13, wherein the wide area network is a cellular telephone network.

16. The method of claim 12, wherein the plurality of registered devices on the local area network comprise at least one of a mobile phone, a video game console, a personal digital assistant (PDA), a desktop computer, a laptop computer, a digital still camera, a digital video camera, a digital portable audio device, and audio/video enabled devices including televisions, digital video recorders (DVR) and portable entertainment devices.

17. The method of claim 12, wherein the received multimedia data further comprises text data.

18. The method according to claim 12, wherein at least one of the plurality of registered devices on the local area network comprises a terminal that is configured to receive the multiplex signal and present select multimedia data contained within the multiplex signal to a user.

19. The method according to claim 18, wherein at least one of the plurality of registered devices on the local area network comprises a node that is configured to receive the multiplex signal, determine the multimedia content contained within the multiplex signal, and issue instructions to the terminal indicating which multimedia data the terminal should present to a user.

20. The method according to claim 19, further comprising the step of determining the multimedia content of the multiplex signal by either parsing the multiplex signal, or by analyzing the index information contained within the independent logical channel of the multiplex signal.

21. An apparatus for wirelessly distributing multimedia data to a plurality of registered devices on a local area network, comprising:
means for receiving multimedia data from the plurality of registered devices residing on the local area network, wherein the multimedia data comprises at least one of audio data, video data, and graphics data;
means for creating a multiplex signal that includes the multimedia data from each of the plurality of registered devices;
means for compiling index information from each of the plurality of registered devices; and
means for multicasting the multiplex signal to each of the plurality of registered devices residing on the local area network using a multiplex channel comprising a plurality of logical channels, wherein each of the logical channels represents the multimedia data received from a different one of the plurality of registered devices on the local area network, wherein the multiplex channel includes a logical channel for each of the plurality of registered devices and an independent logical channel that contains the compiled index information that identifies the multimedia data contained in each logical channel of the multiplex signal.

22. The apparatus of claim 21, further comprising at least one source of multimedia data that resides on a wide area network.

23. The apparatus of claim 22, wherein the wide area network is one of the Internet and a cellular telephone network.

24. The apparatus of claim 21, wherein the plurality of registered devices on the local area network comprise at least one of a mobile phone, a video game console, a personal digital assistant (PDA), a desktop computer, a laptop computer, a digital still camera, a digital video camera, a digital portable audio device, and audio/video enabled devices including televisions, digital video recorders (DVR) and portable entertainment devices.

25. The apparatus of claim 21, wherein the received multimedia data further comprises text data.

26. The apparatus of claim 21, wherein at least one of the plurality of registered devices on the local area network comprises a terminal that is configured to receive the multiplex signal and present select multimedia data contained within the multiplex signal to a user.

27. The apparatus of claim 26, wherein at least one of the plurality of registered devices on the local area network comprises a node that is configured to receive the multiplex signal, determine the multimedia content contained within the multiplex signal, and issue instructions to the terminal indicating which multimedia data the terminal should present to a user.

28. The apparatus of claim 27, further comprising means for determining the multimedia content of the multiplex signal by either parsing the multiplex signal, or by analyzing the index information contained within the logical channel of the multiplex signal.

\* \* \* \* \*